United States Patent [19]

Alaux et al.

[11] Patent Number: 4,939,351
[45] Date of Patent: Jul. 3, 1990

[54] AUTOMATIC PAYMENT MACHINE DELIVERING A VOUCHER

[75] Inventors: Bernard Alaux; Jacques Cailles, both of Valence; Jacques Perge, St. Marcel Les Valence, all of France

[73] Assignee: Crouzet, Montrouge, France

[21] Appl. No.: 174,685

[22] Filed: Mar. 29, 1988

[30] Foreign Application Priority Data

Mar. 30, 1987 [FR] France ............................ 87 04463

[51] Int. Cl.⁵ .............................................. G06F 15/30
[52] U.S. Cl. ...................................... 235/379; 235/432; 235/475; 902/18; 902/36
[58] Field of Search ............... 902/36, 18; 235/379, 235/432, 433, 475

[56] References Cited

U.S. PATENT DOCUMENTS

| | | | |
|---|---|---|---|
| 3,760,162 | 9/1973 | Holter | 902/18 X |
| 3,958,103 | 5/1976 | Oka et al. | |
| 3,973,237 | 8/1976 | Sawaguchi et al. | 902/18 X |
| 3,984,660 | 10/1976 | Oka et al. | |
| 4,266,121 | 5/1981 | Hirose | |
| 4,456,234 | 6/1984 | Simonotti et al. | |
| 4,570,917 | 2/1986 | Marass | |
| 4,628,192 | 12/1986 | Suzuki | |

FOREIGN PATENT DOCUMENTS

| | | |
|---|---|---|
| 0036266 | 9/1981 | European Pat. Off. |
| 2425735 | 5/1974 | Fed. Rep. of Germany |
| 2152907 | 8/1985 | United Kingdom |

*Primary Examiner*—David L. Trafton
*Attorney, Agent, or Firm*—Lowe, Price, LeBlanc, Becker & Shur

[57] ABSTRACT

An automatic payment machine is provided for electronically checking the validity of instruments of payment with deliverance of a voucher. It includes means for maintaining the voucher in a waiting position in the path of the instrument of payment so that this latter takes it along with it when it passes, for restoring the instrument and the voucher simultaneously.

2 Claims, 2 Drawing Sheets

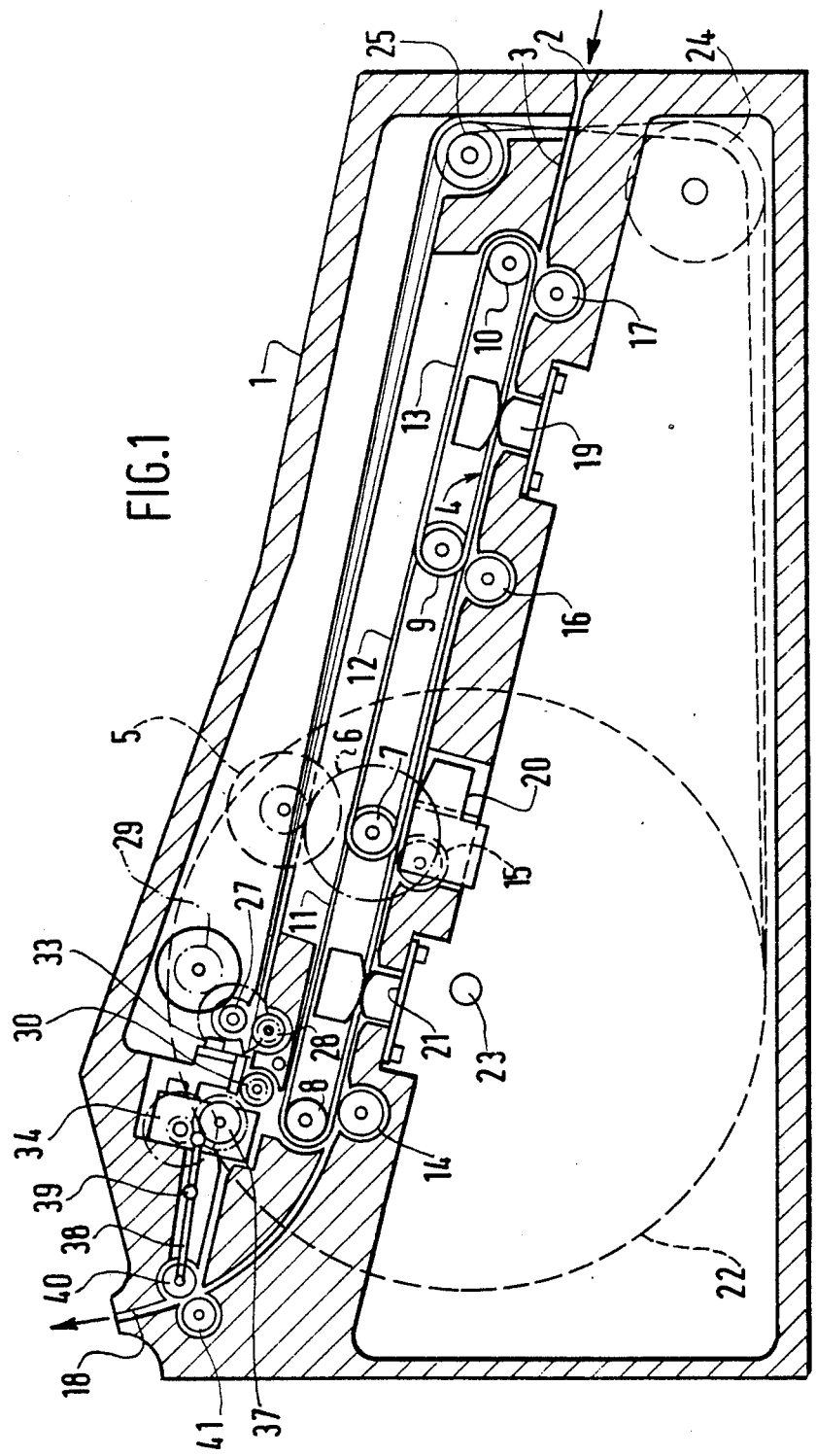

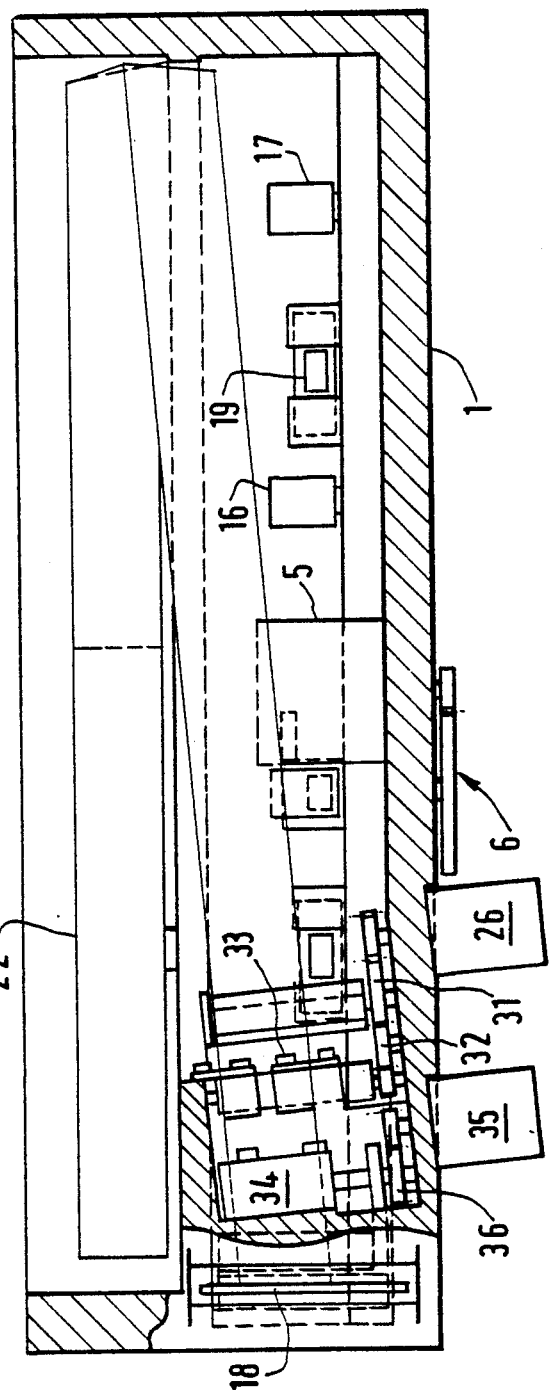

AUTOMATIC PAYMENT MACHINE DELIVERING A VOUCHER

BACKGROUND OF THE INVENTION

1. Field of the Invention

The present invention relates to an automatic payment machine for checking the validity of an instrument of payment by means of control electronics, giving a voucher back with the instrument of payment and comprising two separate kinematic chains, one for processing the instrument of payment and the other for making out the voucher and for driving the instrument of payment and voucher towards a common outlet.

Such automatic machines are currently used in payment systems such as public transports, motorways or pay-parking.

2. Description of the Prior Art

An automatic machine of the above defined type is already known from the patent DE-A-2 425 735. This apparatus checks the validity of an instrument of payment, here a prepaid card, and returns it into a bowl. If the instrument of payment is valid, a voucher, here a transport ticket, is made out and delivered into the same bowl.

In such an apparatus, the kinematic chain which processes the instrument of payment and the kinematic chain which makes out the voucher open into the common bowl through two separate slits disposed side by side. In addition, the instrument of payment and the voucher arrive in the bowl at two separate times.

The result is that the user tends to make a first gesture for recovering the first of these objects which arrives in the bowl and puts it in his pocket, then a second gesture for recovering the second object which has generally arrived meantime. The result is a slowing down of the flow of users.

Moreover, with such an apparatus, there is a risk that a user in a hurry might forget to take that one of the two objects which arrives last.

The present invention overcomes the above drawback by providing an automatic machine for which the instrument of payment and the voucher are readily and rapidly recovered together by the user.

SUMMARY OF THE INVENTION

For this, it provides a device of the above defined type in which the kinematic chain for the voucher comprises means for maintaining this voucher in a waiting position, in the path of the instrument of payment so that this latter carries it along with it when it passes and the instrument of payment and the voucher arrive simultaneously at the common outlet.

In the automatic machine of the invention, the instrument of payment and the voucher arrive simultaneously at the common outlet and, since the voucher is held in a waiting position in the path of the instrument of payment, these two objects in fact form a single "packet" which is taken in a single gesture by the user. When the automatic machine is disposed in the path normally taken by the users, the common outlet may be situated downstream of the point in this path where the instrument of payment is introduced, which has the advantage of inciting the users to advance thus promoting the flow of traffic.

Advantageously, the means for maintaining the voucher in a waiting position consist of a presser roller mounted freely rotating on a swinging lever and able to take up two separate positions, depending on the profile of a cam, a first position in which it bears against a counter roller and a second position in which it is not in contact with the counter roller and thus leaves the passage free for the voucher.

BRIEF DESCRIPTION OF THE DRAWINGS

The present invention will be better understood from the following description of the preferred embodiment of the automatic machine of the invention, with reference to the accompanying drawings in which:

FIG. 1 is a sectional view showing the two kinematic chains of the automatic machine, and FIG. 2 is a top view of the automatic machine of FIG. 1 with the cover partially removed.

DESCRIPTION OF THE PREFERRED EMBODIMENT

The automatic payment machine shown in the figures is in the form of a rigid case 1 in which are assembled conventional electronic control means and their power supply, not shown, and the means required for causing an instrument of payment to travel through a first kinematic chain, for processing by the control electronics. A second kinematic chain forms a voucher from a paper roll 22 using the maximum possible volume in the automatic machine for increasing the operating independence thereof. The path of the instrument of payment will now be described. The instrument of payment is introduced into the machine through an inlet slit 2, its presence is detected for example by means of an optoelectronic sensor, not shown, which results in starting up a drive motor 5. This motor, through gears 6, communicates its movement to a roller 7. This roller is in engagement with three other drive rollers 8, 9, 10 through three resilient belts 11, 12, 13. These belts bear on four counter rollers 14, 15, 16 and 17. The distance between the axes of these four counter rollers is less than the length of the instrument to be conveyed. Thus, at least one drive stage is always engaged with the instrument. The instrument will thus travel over a path 3 from a first drive stage 4 to a common outlet receptacle 18. During this travel, it passes successively in front of a reading head 19, a coding head 20 and a re-reading head 21.

It should be noted that the instrument, at the level of the reading head 19 or the re-reading head 21, is connected to motor 5 through a resilient element, namely the transmission belts 11 to 13. Thus, the speed of the instrument of payment is likely to vary. This is acceptable to the extent that the precision of the travel speed of the instrument, during reading, is not critical. On the other hand, at the time of coding, where this speed must be very regular, the instrument is in direct connection with the motor through rollers 7 and 15, without a resilient intermediate means.

The voucher is made out from a paper strip wound on a roller 22 freely rotatable about a hub 23. The paper strip passes successively over two cones 24 and 25 with opposite slants for offsetting the paper strip with respect to the plane of roller 22, which makes space available and so increases the length of the paper roll and so the paper capacity of the machine.

The paper strip then passes through a drive-printing module. This module is formed of a drive motor 26 which drives two drive rollers 27 and 28 through gearing 29. Roller 28 drives a printing roller 30 by means of two gears 31 and 32. Opposite the printing roller 30 are situated two printing heads 33, for example thermal heads. Once printed by the drive-printing module, the paper strip passes through rotary shears 34. These shears are set in movement by a motor 35 by means of gearing 36. A cam 37 fixed to the shaft of the shears serves as fulcrum for a lever 38. This lever is rotatable about axis 39 and has at its other end a roller 40 which is also freely rotatable. At rest, roller 40 is in the top position and thus leaves a passage between itself and the counter roller 41. During cutting, a detail of shape on cam 37 places roller 40 in the low position. The cut voucher is then blocked between roller 41 and roller 40. The instrument of payment, driven by the last drive stage, belt 11 and counter roller 14 then passes between rollers 40 and 41 by moving them apart. The voucher is then driven through the outlet slit 18 by the instrument of payment.

Of course, the travelling speeds of the instrument of payment and the voucher are regulated by the electronics so that the voucher always arrives between rollers 40 and 41 before the instrument of payment is restored.

The automatic machine of the invention lends itself particularly well to the construction of payment systems delivering a payment voucher by means of an instrument of payment of the card type.

What is claimed is:

1. An automatic payment machine for checking the validity of an instrument of payment by means of control electronics, giving a voucher back with the instrument of payment and comprising two separate kinematic chains, one for processing the instrument of payment and the other for making out the voucher and for driving the instrument of payment and voucher towards a common outlet, wherein the kinematic chain for the voucher comprises means for maintaining this voucher in a waiting position, in the path of the instrument of payment so that this latter carries it along with it when it passes and the instrument of payment and the voucher arrive simultaneously at the common outlet.

2. The automatic payment machine according to claim 1, wherein the means for maintaining the voucher in the waiting position consist of a presser roller mounted freely rotating on a swinging lever and able to take up two separate positions, in accordance with the profile of a cam, a first position in which it bears against a counter roller and a second position in which it is not in contact with said counter roller and thus leaves the passage free for the voucher.

* * * * *